US012205778B2

(12) United States Patent
Fujihara et al.

(10) Patent No.: US 12,205,778 B2
(45) Date of Patent: Jan. 21, 2025

(54) TRIGGER SWITCH

(71) Applicant: OMRON Corporation, Kyoto (JP)

(72) Inventors: Takumi Fujihara, Kyoto (JP); Koichi Furusawa, Kyoto (JP); Taiki Koyama, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 17/521,930

(22) Filed: Nov. 9, 2021

(65) Prior Publication Data

US 2022/0181100 A1 Jun. 9, 2022

(30) Foreign Application Priority Data

Dec. 4, 2020 (JP) ................................ 2020-202101

(51) Int. Cl.
*H01H 13/14* (2006.01)
*H01H 13/20* (2006.01)

(52) U.S. Cl.
CPC ........... *H01H 13/14* (2013.01); *H01H 13/20* (2013.01); *H01H 2235/018* (2013.01)

(58) Field of Classification Search
CPC .. H01H 13/14; H01H 13/20; H01H 2235/018; H01H 13/52; H01H 2201/02; H01H 2239/006; H01H 9/041; H01H 9/06; H01H 9/02; H01H 9/0214; H01H 9/04; H01H 2221/044; H01H 2223/04; B25F 5/02; G01L 1/20
See application file for complete search history.

(56) References Cited

U.S. PATENT DOCUMENTS 4,168,408 A * 9/1979 Yamane ................. H01H 13/18 200/47
6,288,353 B1 * 9/2001 Chiang .................. H01H 3/125 200/344

(Continued)

FOREIGN PATENT DOCUMENTS

CN 101297385 A 10/2008
CN 103021708 A 4/2013

(Continued)

OTHER PUBLICATIONS

The Office Action (CNOA) issued on Jul. 10, 2024 in a counterpart Chinese patent application No. 202111318039.4.

(Continued)

*Primary Examiner* — Lheiren Mae A Caroc
(74) *Attorney, Agent, or Firm* — METROLEX IP LAW GROUP, PLLC; Robert L. Scott, Esq

(57) ABSTRACT

A trigger switch according to one or more embodiments may include a pressure sensor such as a pressure sensitive element that detects a depressed amount of a trigger in response to a depressing operation on the trigger. A trigger switch may include a trigger movable in response to a depressing operation, an urging member including a first end in contact with the trigger and a second end and urging the trigger in a direction opposite to a depressing direction in which the trigger is depressed, an elastic member in contact with the second end of the urging member, and a pressure sensor in contact with the elastic member to detect pressure applied from the elastic member.

5 Claims, 5 Drawing Sheets

TS

(56) References Cited

U.S. PATENT DOCUMENTS

| | | | |
|---|---|---|---|
| 7,705,258 | B2 * | 4/2010 | Geldmacher ...... G07C 9/00944 200/341 |
| 10,797,622 | B2 * | 10/2020 | Hikawa ..................... H02P 6/08 |
| 2009/0277766 | A1 | 11/2009 | Fujitsuna |
| 2010/0258631 | A1 * | 10/2010 | Rueblinger ............ H01H 13/02 200/522 |
| 2010/0282585 | A1 * | 11/2010 | Jonas ................... H01H 13/703 200/514 |
| 2013/0075243 | A1 | 3/2013 | Tsuchiya et al. |
| 2017/0144289 | A1 | 5/2017 | Yamashita |
| 2017/0144290 | A1 | 5/2017 | Tsutsui et al. |
| 2018/0287521 | A1 | 10/2018 | Hikawa |
| 2019/0013163 | A1 * | 1/2019 | Chen .................. H01H 13/7065 |
| 2019/0362914 | A1 | 11/2019 | Yano et al. |
| 2020/0004288 | A1 | 1/2020 | Yano et al. |
| 2020/0312585 | A1 | 10/2020 | Yano et al. |
| 2021/0156753 | A1 | 5/2021 | Kawamura et al. |
| 2023/0005679 | A1 | 1/2023 | Chuanyang et al. |

FOREIGN PATENT DOCUMENTS

| | | | |
|---|---|---|---|
| CN | 108695091 | A | 10/2018 |
| CN | 110301022 | A | 10/2019 |
| CN | 210743849 | U | 6/2020 |
| CN | 111868866 | A | 10/2020 |
| JP | 2017-98046 | A | 6/2017 |
| JP | 2017-100275 | A | 6/2017 |
| JP | 2019-63927 | A | 4/2019 |

OTHER PUBLICATIONS

The Office Action (JPOA) issued on Jun. 4, 2024 in a counterpart Japanese patent application No. 2020-202101, with English translation.

* cited by examiner

TRIGGER SWITCH

CROSS-REFERENCE TO RELATED APPLICATION

This application claims priority to Japanese Patent Application No. 2020-202101 filed on Dec. 4, 2020, the contents of which are incorporated herein by reference.

FIELD

The present disclosure relates to a trigger switch that moves in response to a depressing operation on a trigger.

BACKGROUND

A trigger switch is used to control the operation of a power tool with a depressing operation. For example, Patent Literature 1 describes a trigger switch including a load sensor. The trigger switch described in Patent Literature 1 includes a trigger directly on the load sensor. The load sensor detects the depressed amount of the trigger and then causes a motor to rotate.

CITATION LIST

Patent Literature

Patent Literature 1: Japanese Unexamined Patent Application Publication No. 2017-100275

SUMMARY

For the trigger switch described in Patent Literature 1 including the trigger directly pressing the load sensor, a depressing operation on the trigger may not have a long stroke, and thus may not provide a sufficient tactile sensation of operation.

A trigger switch according to one or more embodiments may provide an improved tactile sensation of operation.

A trigger switch according to one or more embodiments may include a trigger movable in response to a depressing operation, an urging member including a first end in contact with the trigger and a second end and urging the trigger in a direction opposite to a depressing direction in which the trigger is depressed, an elastic member in contact with the second end of the urging member, and a pressure sensor in contact with the elastic member to detect pressure applied from the elastic member.

The trigger switch may further include a housing accommodating the pressure sensor. The elastic member includes a part of a wall separating an inside and an outside of the housing. The urging member includes the second end in contact with the elastic member on an outside surface of the housing. The pressure sensor is in contact with the elastic member on an inside surface of the housing.

In the trigger switch according to one or more embodiments, the housing may be sealed.

The trigger switch according to one or more embodiments may include the elastic member to detect pressure and may allow a longer stroke to produce advantageous effects including an improved tactile sensation of operation.

DETAILED DESCRIPTION

One or more embodiments will now be described with reference to the drawings.

A trigger switch according to one or more embodiments may be usable in various electric devices such as electric drills, electric saws, electric screwdrivers, electric wrenches, electric grinders, and other power tools including a motor or another drive. In one or more embodiments below, a trigger switch TS will be described with reference to the drawings.

Figure 1:
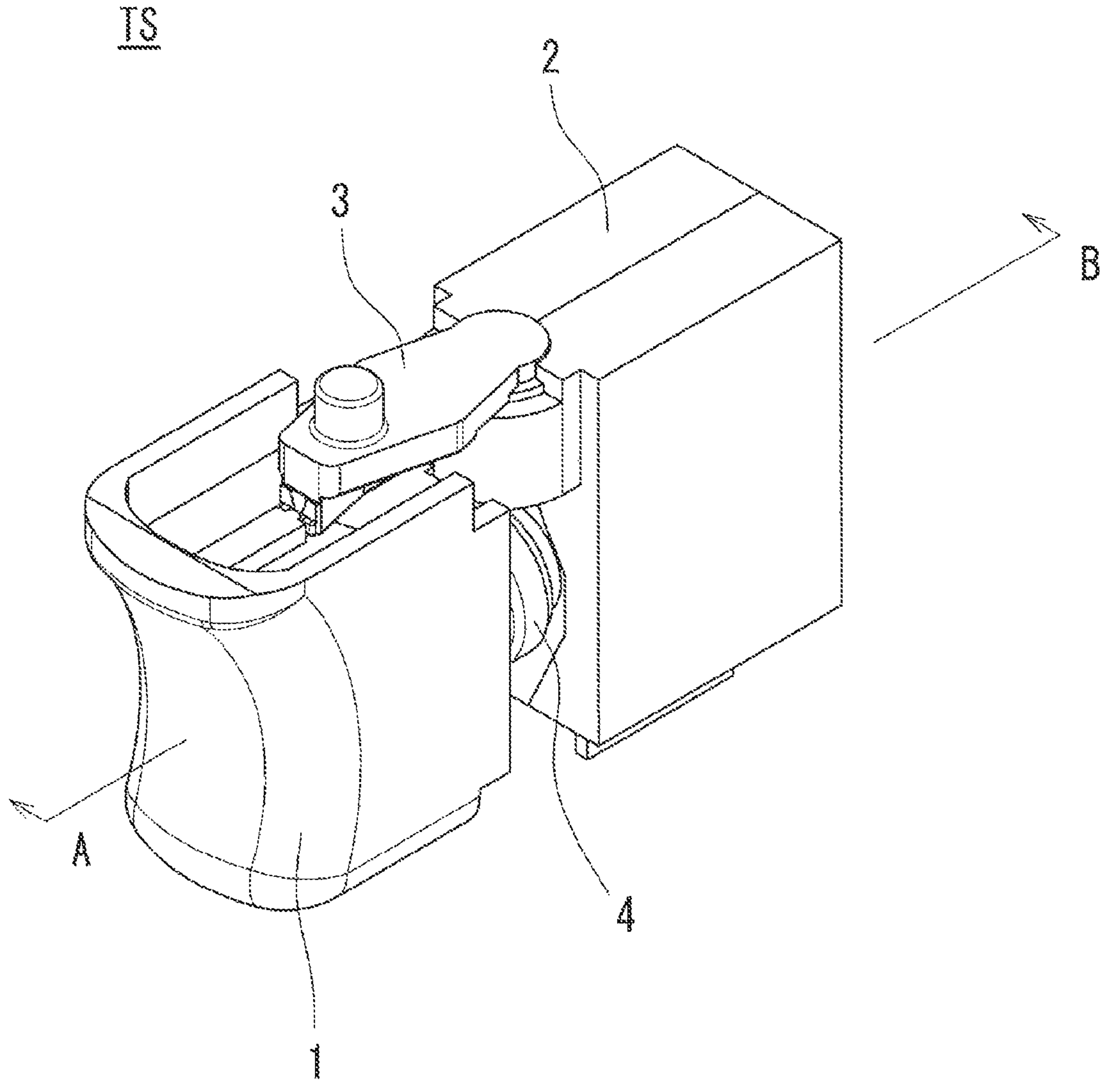
FIG. 1 is a diagram illustrating a schematic perspective view of a trigger switch according to one or more embodiments, showing an exemplary appearance.

FIG. 1 is a schematic perspective view of the trigger switch TS according to one or more embodiments , showing its example appearance. FIG. 1 shows the appearance of the trigger switch TS that may be incorporated into an electric device ET (with reference to FIG. 5) such as a power tool. The trigger switch TS is operable by an operator of the electric device ET. The operator depresses a trigger 1 in the trigger switch TS to drive a drive M (with reference to FIG. 5), such as an electric motor, incorporated in the electric device ET. The trigger switch TS includes a substantially rectangular housing 2 and the trigger 1. The housing 2 is incorporated into the electric device ET. The trigger 1 may be depressed by the operator. The trigger switch TS further includes a switch lever 3 for switching the driving direction of the drive M, or for example, the rotation direction of an electric screwdriver between the forward rotation and the reverse rotation. The housing 2 is a substantially rectangular prism. The housing 2 is sealed to be waterproof and accommodates various electronic components. The housing 2 includes a cylindrical guide 4 on its surface to which the trigger 1 is attached. The guide 4 guides movement of the trigger 1. For ease of explanation, the orientation of the trigger switch TS is hereafter defined as the front for the surface to which the trigger 1 is attached and the rear for the housing 2. However, this does not limit the orientation of the trigger switch TS in use.

Figure 2:
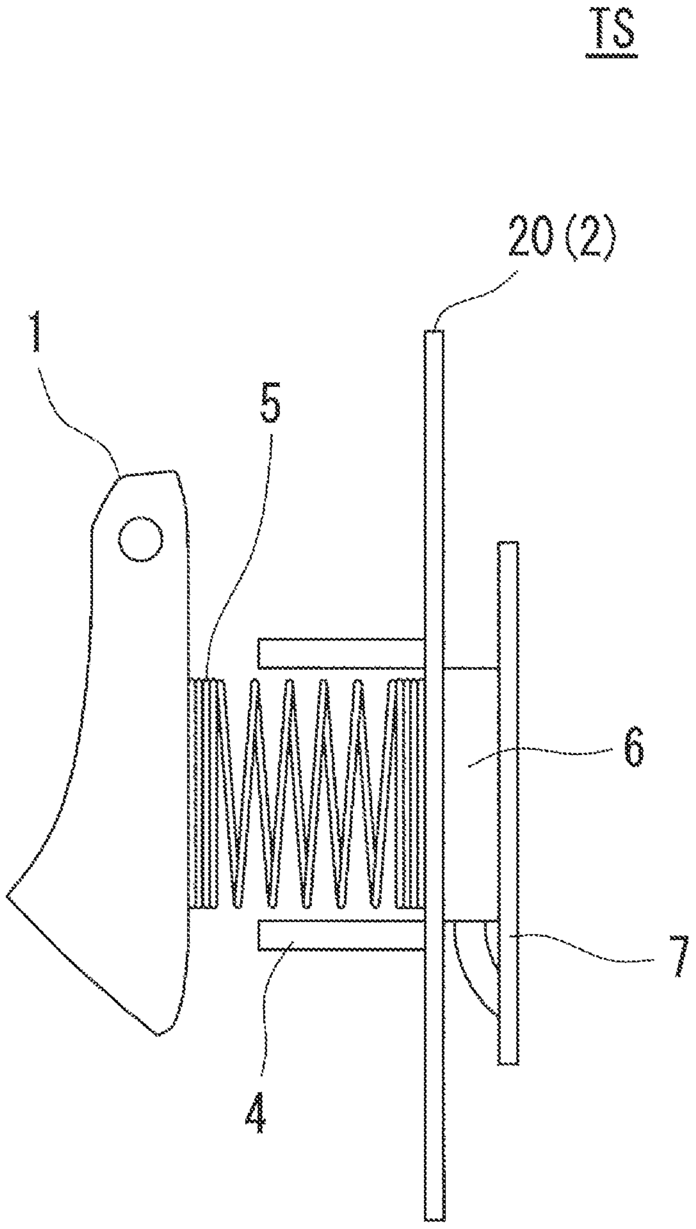
FIG. 2 is a diagram illustrating a schematic side view of a trigger switch according to one or more embodiments, showing an example in which main components are partially cut away.

The internal structure of the trigger switch TS will now be described. FIG. 2 is a schematic side view of the trigger switch TS according to one or more embodiments, showing its example main components partially cut away. FIG. 2 shows the main components of the trigger switch TS in a cross-sectional view taken along a vertical plane along line A-B shown in FIG. 1 as viewed in the direction indicated by arrows. The main components of the trigger switch TS shown in FIG. 2 mainly include the trigger 1 and a front portion of the housing 2. FIG. 2 shows each component in a simplified manner to facilitate understanding of the internal structure.

The front surface of the housing 2 includes an elastic member 20 formed from a resin, such as flexible waterproof rubber. The elastic member 20 is a plate and serves as a wall separating the inside and the outside of the housing 2. The trigger 1 has a rear connected with a front end of an urging member 5, such as a compressed coil spring. The urging member 5 has a rear end connected to the elastic member 20 on the front surface of the housing 2. When the trigger 1 is depressed and moves rearward, the urging member 5, which has the front end in contact with the trigger 1 and the rear end in contact with the elastic member 20 fixed to the housing 2, is compressed in the depressing direction and urges the trigger 1 forward and the elastic member 20 rearward. The urging member 5 is placed in the cylindrical guide 4. In response to the depressing operation, the guide 4 accommodating the urging member 5 prevents the urging member 5 from bending off the depressing direction. This may allow the trigger 1 to move stably. A pressure sensor 6 including a pressure sensitive element, such as a piezoelectric element, is in contact with the rear surface of the elastic member 20, which is the inner surface of the housing 2. The pressure sensor 6 is mounted on a board 7 on which various electronic components are mounted. The pressure sensor 6 including a piezoelectric element uses change in an electric resistance under the piezoresistive effect from external pressure deforming a diaphragm and detects pressure applied from the elastic member 20 based on the change in an electric resistance value.

Figure 3:
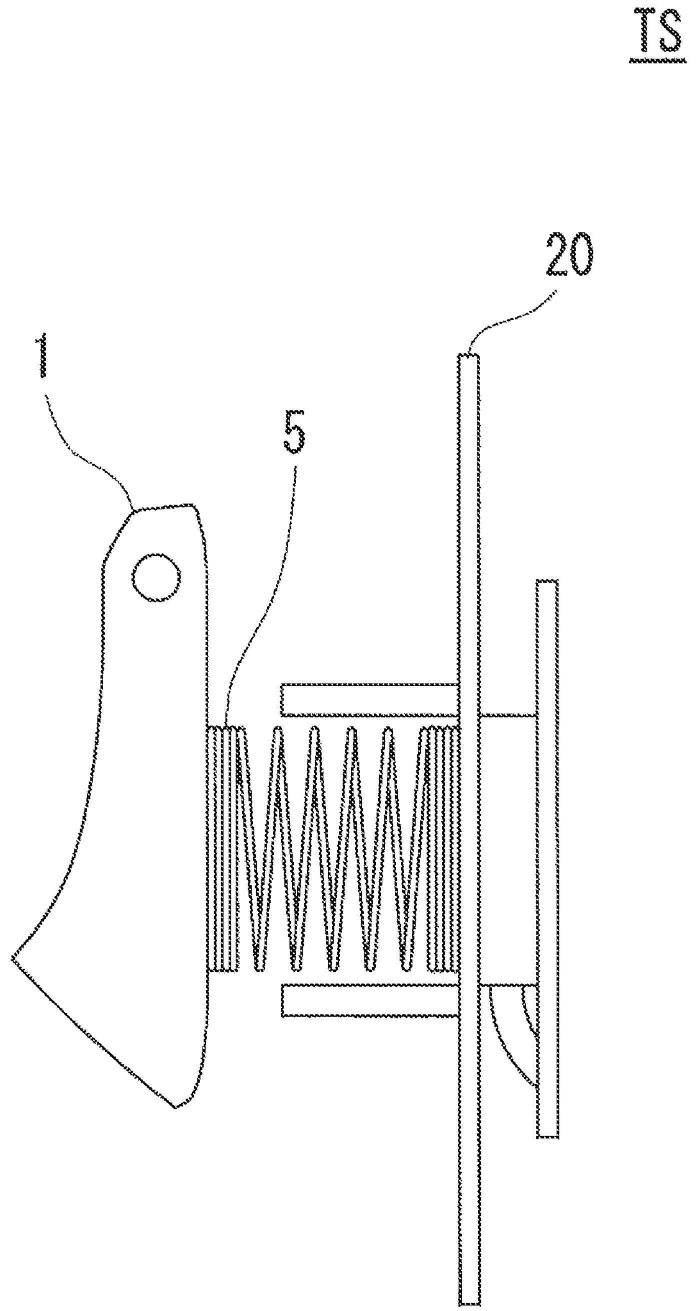
FIG. 3 is a diagram illustrating a schematic side view of a trigger switch according to one or more embodiments, showing an example in which main components are partially cut away.

A movement of the trigger switch TS according to one or more embodiments will now be described. FIG. 3 is a schematic side view of the trigger switch TS according to one or more embodiments, showing its example main components partially cut away. In FIG. 3, the trigger 1 is not depressed. In the state in FIG. 3, the trigger 1 is urged forward by the urging member 5 and is at the front end of its movable range.

Figure 4:
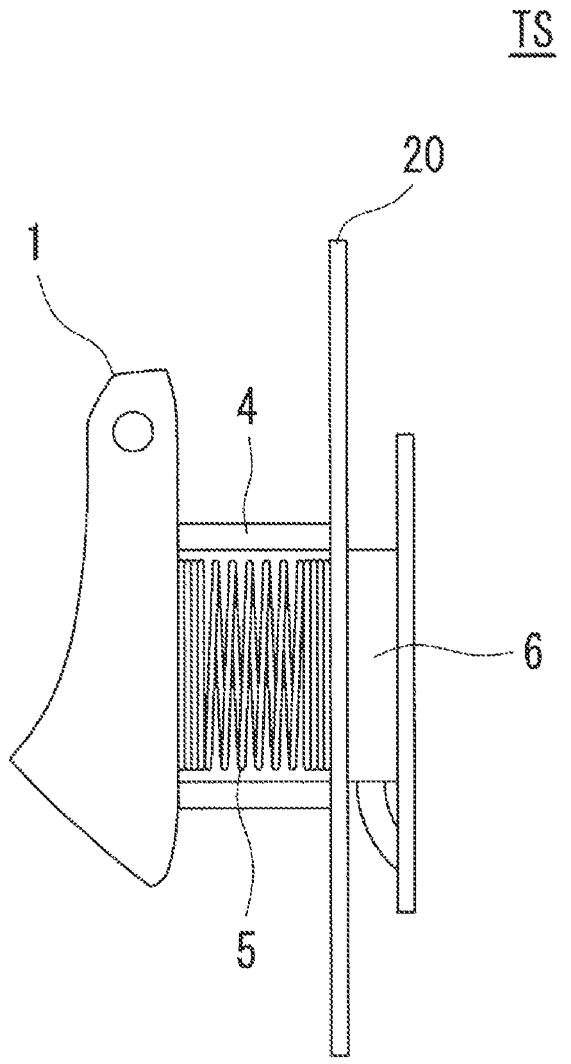
FIG. 4 is a diagram illustrating a schematic side view of a trigger switch according to one or more embodiments, showing an example in which main components are partially cut away.

FIG. 4 is a schematic side view of the trigger switch TS according to one or more embodiments, showing its example main components partially cut away. FIG. 4 shows the trigger 1 on which a depressing operation has been performed to move the trigger 1 in the state in FIG. 3 rearward. In response to a depressing operation on the trigger 1 performed by the operator, the trigger 1 moves rearward to come in contact with the front end of the guide 4. When the trigger 1 moves rearward, the urging member 5 is compressed and presses, with a force corresponding to the depressed amount, the elastic member 20 in contact with the rear end rearward and the trigger 1 in contact with the front end forward. The elastic member 20 is pressed from the front and deflects, pressing the pressure sensor 6 located at the rear. The pressure sensor 6 detects pressure applied from the elastic member 20 based on a change in the electric resistance value. Although the rear surface of the elastic member 20 presses the pressure sensor 6, the rearward deflection of the rear surface of the elastic member 20, or specifically, the distance by which the rear surface moves rearward, is shorter than the depressed amount of the trigger 1.

In response to the operator releasing the depressing operation on the trigger 1, the trigger 1 is urged forward under the urging force from the urging member 5 and returns to the state in FIG. 3.

Figure 5:
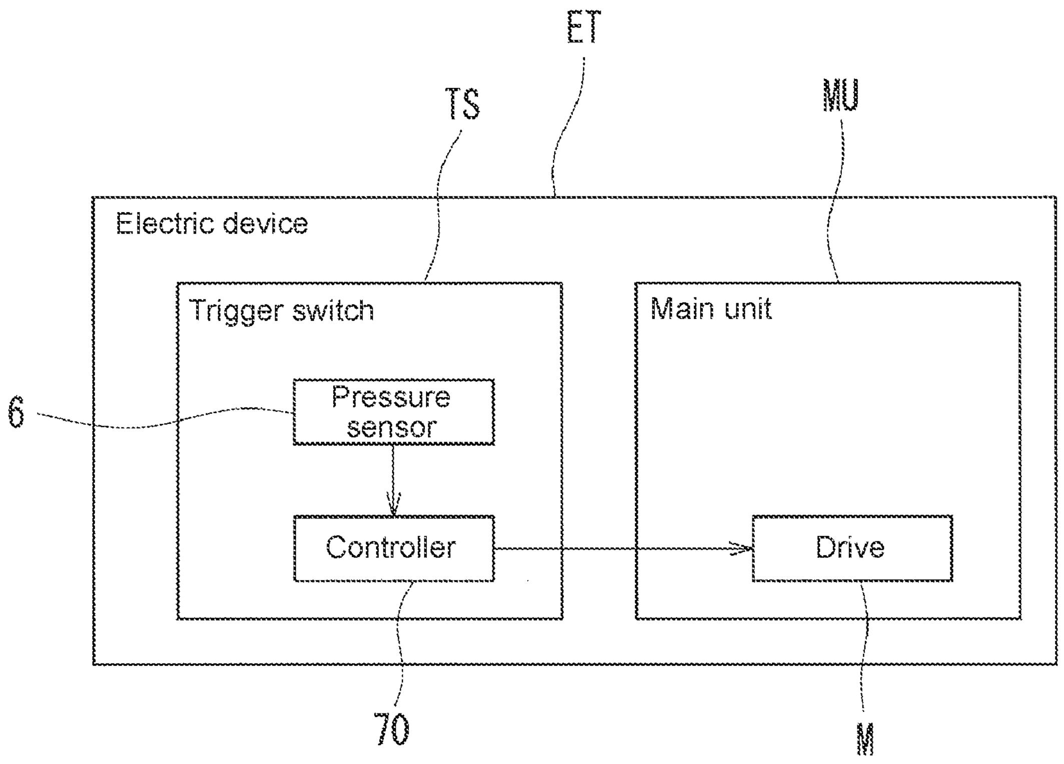
FIG. 5 is a diagram illustrating a schematic block diagram of an electric device incorporating a trigger switch according to one or more embodiments, showing an examplary control configuration.

An example configuration of the electric device ET incorporating the trigger switch TS according to one or more embodiments will now be described. FIG. 5 is a schematic block diagram of the electric device ET incorporating the trigger switch TS according to one or more embodiments. The electric device ET, such as a power tool, incorporates the trigger switch TS in a main unit MU. The main unit MU includes the drive M such as a motor. The trigger switch TS includes the pressure sensor 6, which detects the depressed amount of the trigger 1 as pressure from the elastic member 20, and a controller 70, which outputs a drive signal to the main unit MU in response to the depressed amount detected by the pressure sensor 6 as pressure.

The controller 70 included in the trigger switch TS is, for example, a circuit including a microcomputer including integrated circuits such as large-scale integration (LSI) circuits or very large-scale integration (VLSI) circuits, electronic devices, and terminals. The controller 70 is mounted on the board 7 in the housing 2. The controller 70 receives an input of a detection result from the pressure sensor 6, performs various types of processing in accordance with the detection result, and outputs, to the main unit MU, a drive signal for driving the drive M, such as a motor, included in the main unit MU of the electric device ET. The electric device ET drives the drive M in response to the drive signal input into the main unit MU.

As described above, the trigger switch TS according to one or more embodiments accommodates the pressure sensor 6 in the housing 2 that is sealed to be waterproof, and the pressure sensor 6 detects pressure applied from the urging member 5 in contact with the trigger 1 through the elastic member 20. The pressure sensor 6 is not directly pressed by the trigger 1 that moves in response to a depressing operation but detects the pressure resulting from the depressing operation through the urging member 5 and the elastic member 20. This structure increases the distance by which the trigger 1 moves in response to a depressing operation or may allow a longer stroke, thus allowing the operator to obtain a tactile sensation through the depressing operation while maintaining the waterproof housing 2. The trigger switch TS according to one or more embodiments improves the tactile sensation of operation compared with, for example, the trigger 1 directly pressing the pressure sensor 6.

One or more embodiments may not be limited to the above described embodiments and may be modified in various manners. The above described embodiments are mere examples and the technical scope is not defined by the description given above but by the claims. Any modifications and alterations contained in the equivalency range of the claims fall within the scope.

For example, although the front surface of the housing 2 includes the elastic member 20 in the above embodiment, the elastic member 20 may encompass the entire front surface of the housing 2. Alternatively, a part of the surface of the housing 2, around a point in contact with the urging member 5, may include the elastic member 20.

In a further example, although the pressure sensor 6 includes a piezoelectric element in the above description, one or more embodiments may not be so limited and may be variously modified to include, for example, a capacitance pressure sensor that detects a change in capacitance from an external force deforming a movable electrode.

In a further example, although the guide 4 is cylindrical and covers the urging member 5 in the above description, one or more embodiments may not be so limited and may be variously modified to include, for example, any guide 4 that may prevent the urging member 5 from bending off the depressing direction.

In a further example, although the controller 70 is accommodated in the housing 2 in the above description, one or more embodiments may not be so limited and may be variously modified to include, for example, the controller 70 being external to the housing 2 but accommodated in the main unit MU.

The invention claimed is:

1. A trigger switch, comprising:

a trigger movable in response to a depressing operation;

an urging member including a first end in contact with the trigger and a second end, the urging member urging the trigger in a direction opposite to a depressing direction in which the trigger is depressed;

an elastic member in direct contact with the second end of the urging member; and a pressure sensor in contact with the elastic member to detect a depressed amount of the trigger as an amount of pressure applied to the trigger during the depressing operation from contact with the elastic member.

2. The trigger switch according to claim 1, further comprising a housing accommodating the pressure sensor, wherein the elastic member comprises a part of a wall separating an inside and an outside of the housing, the urging member comprises the second end in contact with the elastic member on an outside surface of the housing, and the pressure sensor is in contact with the elastic member on an inside surface of the housing.

3. The trigger switch according to claim 2, wherein the housing is sealed.

4. The trigger switch according to claim 1, wherein the elastic member is a plate shaped member formed from a flexible waterproof resin.

5. The trigger switch according to claim 1, wherein the pressure sensor comprises a piezoelectric element in contact with a rear surface of the elastic member.

* * * * *